Patented Aug. 16, 1949

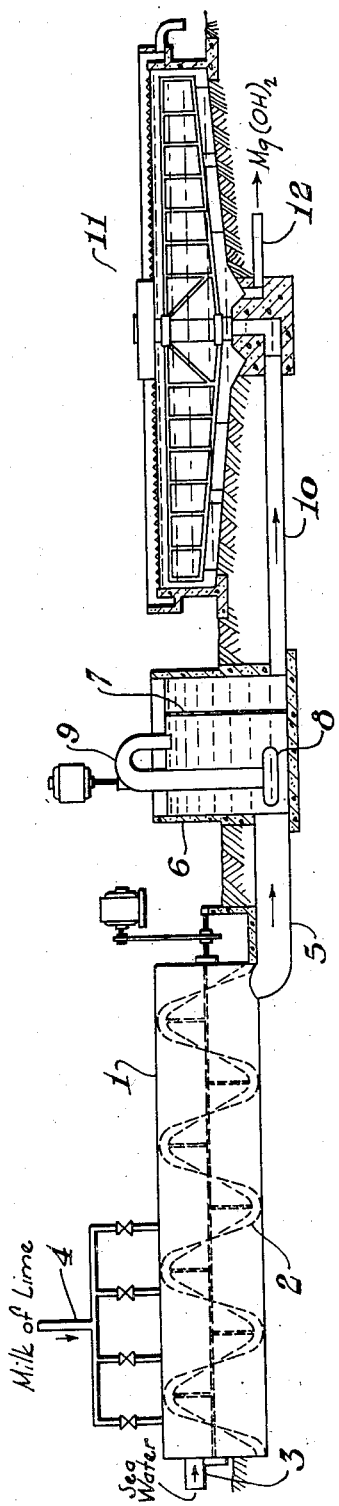

2,479,138

UNITED STATES PATENT OFFICE 2,479,138

PRODUCTION OF MAGNESIUM HYDROXIDE FROM BRINES

Leslie Wayne Scoles, Midland, Mich., assignor to The Dow Chemical Company, Midland, Mich., a corporation of Delaware Application March 2, 1942, Serial No. 432,921

3 Claims. (Cl. 23—201)

This invention relates to an improved process for the preparation of magnesium hydroxide from brines containing dissolved magnesium salts.

It is well known that magnesium hydroxide may be produced by treating natural or artificial brines containing dissolved magnesium salts, such as sea water, with aqueous alkali. Ordinarily, however, the magnesium hydroxide precipitated in this manner is an amorphous or gelatinous substance which has a low settling rate, often no more than 0.1 to 1.0 foot per hour, and hence is not readily separable from the treated brine by either sedimentation or filtration.

It is therefore an object of this invention to provide a method for treating brines containing dissolved magnesium salts to precipitate magnesium hydroxide in a form having a substantially higher settling rate than the material ordinarily prepared.

According to the invention, magnesium hydroxide of increased settling rate may be produced by gently intermixing the magnesium-containing brine and an aqueous alkali to effect precipitation of magnesium hydroxide in flocculent form, and thereafter subjecting the resulting precipitate-containing brine to vigorous agitation. This agitation tends to break up the flocs of magnesium hydroxide initially formed and to convert the precipitate to a denser form having a settling rate nearly twice that of flocculent magnesium hydroxide as ordinarily obtained.

The process of the invention may advantageously be applied to any natural or artificial brine containing dissolved magnesium salts, but is especially useful in the production of magnesium hydroxide from sea water. The precipitating agent employed may be any aqueous alkali, usually, of course, a solution or suspension of an alkali or alkaline-earth metal hydroxide; slaked lime is ordinarily employed because of its cheapness and availability, milk of lime containing from 12 to 20 pounds of lime per cubic foot being preferable. The relative proportions of brine and alkali are not critical, although it is customary to add the alkali in a quantity sufficient to react with at least the major part of the magnesium in the brine. In the treatment of sea water with lime slurry, it is preferable to add the lime in a proportion at least equivalent to the magnesium content of the sea water, since in this manner the most complete recovery of magnesium is obtained.

In practicing the invention, the magnesium-containing brine and the aqueous alkali are first intermixed gently, usually at atmospheric temperature, for a time sufficient to effect substantially complete precipitation of the magnesium salts as flocculent magnesium hydroxide. This process should, of course, be conducted with such thoroughness as to secure even distribution of the alkali throughout the brine, but it is highly desirable, in order to insure formation of a flocculent precipitate, that the mixing be done under conditions of low turbulence. To this end, the equipment is designed to avoid as far as possible fluid velocities in the turbulence range, and mixing is best carried out by slow speed paddle stirrers or ribbon mixers of the "flocculator" type rather than by more vigorous agitators.

Following precipitation of the flocculent magnesium hydroxide, the precipitate-containing suspension is preferably, though not necessarily, transferred to a second zone, and is subjected to vigorous turbulent agitation for a time sufficient to increase substantially the settling rate of the magnesium hydroxide, ordinarily for at least one minute, and most suitably for several minutes. In general, the greater the agitation and the longer the time thereof, the higher the settling rate of the treated precipitate. The type of agitation employed is not critical, provided vigorous turbulent flow is attained, although agitation corresponding to the continuous application by an efficient stirrer or circulating pump of at least 0.001 horse power per gallon of suspension is especially satisfactory.

Following the vigorous agitation, during which the magnesium hydroxide precipitate is rendered denser and more rapidly settleable, the hydroxide-containing suspension is transferred to a sedimentation zone and is there maintained quiescent for a time sufficient to allow the hydroxide to settle. This settled precipitate is then separated from the supernatant liquor and withdrawn as product.

The process may be further described with reference to the accompanying diagrammatic drawing, which illustrates a preferred embodiment of the invention.

As shown in the drawing, initial precipitation of magnesium hydroxide takes place in a flocculator 1, an elongated horizontal vessel provided with ribbon stirrers 2 adapted to rotate at a slow speed. Sea water enters continuously at one end through an inlet 3, and milk of lime is introduced from the header 4 in several streams at intervals along the flocculator 1. The stirrers 2 are operated at a rate sufficient to effect complete intermixing of the sea water and milk of lime without causing appreciable turbulence. Under these conditions magnesium hydroxide precipitates in flocculent form.

The precipitate-containing suspension formed in the flocculator 1 is withdrawn continuously through an outlet 5 and is transferred to an agitation well 6 near the bottom thereof. As shown, this well 6 is a conventional tank of size sufficient to contain several minutes' inventory of the magnesium hydroxide suspension, and is equipped with one or more baffles 7 to direct the flow of liquor. The well is also provided at its center with an agitator consisting of a motor driven pump 8 adapted to withdraw liquor from the bottom of the well 6 and to force it through a pipe 9 discharging in a downwardly direction near the top of the well. In practice, the pump 8 is operated at a rate sufficient to cause the suspension to flow through the pipe 9 at high velocity, thus achieving great turbulence throughout the entire body of liquor in the well, and increasing markedly the settling rate of the magnesium hydroxide precipitate.

The suspension leaving the well 6 passes through a distributor pipe 10 to one or more sedimentation tanks 11, such as a conventional Dorr tank, and is there maintained quiescent for a time sufficient to allow the magnesium hydroxide precipitate to settle out as a heavy slurry, which is withdrawn as product from the bottom of the tank 11 through an outlet 12. Clarified liquor escapes to waste from the top of the tank.

*Example*

In a typical operation of the apparatus illustrated in the drawing, sea water was admitted to the flocculator 1 at a rate of 5,000 gallons per minute, and there mixed gently with milk of lime introduced in a quantity slightly in excess of that equivalent to the magnesium content of the sea water, thus producing a flocculent precipitate. The pump 8 in the agitation well was operated to circulate liquor through the pipe 9 at a rate of 25,000 gallons per minute, thereby achieving a high degree of turbulence in the tank. Under these conditions, the magnesium hydroxide precipitate in the suspension entering the sedimentation tank 11 exhibited a settling rate of 27.6 inches per hour.

For purpose of comparison, it is noted that when, under otherwise identical conditions, the pump 8 was not operated, the settling rate of the magnesium hydroxide precipitate formed was only 11.0 inches per hour.

From the foregoing, it will be appreciated that the invention provides a process in which magnesium hydroxide is precipitated in a form having a settling rate substantially greater than that of magnesium hydroxide as ordinarily produced. By virtue of this increased settling rate, a considerable economy can be effected in the size and cost of sedimentation equipment, or in the case of existing installations, a markedly higher rate of production can be achieved.

Other modes of applying the principle of the invention may be utilized instead of those explained, change being made as regards the details disclosed, provided the step or steps set forth in the following claims, or the equivalent thereof, be employed.

I claim:

1. In a process for the preparation of magnesium hydroxide in a rapidly settling form from brines containing dissolved magnesium salts, the steps which consist in intermixing the brine and an aqueous alkali by gentle agitation to precipitate magnesium hydroxide in flocculent form, subjecting the suspension of flocculent magnesium hydroxide for at least one minute to vigorous agitation of such magnitude that at least 0.001 horse power is applied per gallon of the suspension in the zone of agitation, then permitting the precipitate to settle and separating the settled sludge from the supernatant liquor.

2. In a process for the preparation of magnesium hydroxide in a rapidly settling form from brines containing dissolved magnesium salts, the steps which consist in intermixing the brine with milk of lime by gentle agitation to precipitate magnesum hydroxide in flocculent form, withdrawing a stream of the resulting suspension of flocculent magnesium hydroxide to an agitation zone of sufficient volume to hold at least one minute's inventory, subjecting the suspension therein for at least one minute to such a degree of agitation as is produced by application of at least 0.001 horse power per gallon of contents of the zone, discharging the suspension from the agitation zone to a settling zone, and separating the settled sludge from the supernatant liquor.

3. In a process for the preparation of magnesium hydroxide from brines containing dissolved magnesium salts wherein the brine is mixed with an aqueous alkali under mild agitation to precipitate magnesium hydroxide in flocculent form, the precipitate being later recovered by settling, the method of treating the flocculent magnesium hydroxide precipitate to increase its settling rate which comprises subjecting the suspension of the magnesium hydroxide for at least one minute to agitation of such magnitude that at least 0.001 horse power is expended per gallon of the suspension undergoing agitation.

LESLIE WAYNE SCOLES.

REFERENCES CITED

The following references are of record in the file of this patent:

UNITED STATES PATENTS

| Number | Name | Date |
|---|---|---|
| 1,270,589 | Barstow | June 25, 1918 |
| 2,019,488 | Farnsworth | Nov. 5, 1935 |
| 2,089,339 | Chesny | Aug. 10, 1937 |
| 2,124,002 | Mastin | July 19, 1938 |
| 2,224,780 | Chesny | Dec. 10, 1940 |
| 2,227,534 | Collins | Jan. 7, 1941 |
| 2,255,422 | Heath et al. | Sept. 9, 1941 |